(12) United States Patent
Hattori

(10) Patent No.: US 8,909,408 B2
(45) Date of Patent: Dec. 9, 2014

(54) VEHICLE CONTROL APPARATUS

(75) Inventor: Tsutomu Hattori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/342,962

(22) PCT Filed: Nov. 4, 2011

(86) PCT No.: PCT/JP2011/075490
§ 371 (c)(1),
(2), (4) Date: Mar. 5, 2014

(87) PCT Pub. No.: WO2013/065188
PCT Pub. Date: May 10, 2013

(65) Prior Publication Data
US 2014/0244089 A1 Aug. 28, 2014

(51) Int. Cl.
*B60W 20/00* (2006.01)
*B60W 10/06* (2006.01)
*B60W 10/08* (2006.01)
*B60K 6/48* (2007.10)
*B60K 6/547* (2007.10)
*B60W 10/02* (2006.01)
*B60W 10/11* (2012.01)
*B60W 30/18* (2012.01)
*F02D 17/00* (2006.01)

(52) U.S. Cl.
CPC ............... *B60W 20/10* (2013.01); *B60K 6/48* (2013.01); *B60K 6/547* (2013.01); *B60W 10/02* (2013.01); *B60W 10/06* (2013.01); *B60W 10/11* (2013.01); *B60W 30/18054* (2013.01); *F02D 17/00* (2013.01); *B60W 2510/0652* (2013.01); *B60W 2510/101* (2013.01); *B60W 2510/102* (2013.01); *B60W 20/40* (2013.01); *B60W 20/50* (2013.01); *Y02T 10/6221* (2013.01); *B60W 10/08* (2013.01); *Y10S 903/93* (2013.01)
USPC .................. 701/22; 180/65.265; 903/930

(58) Field of Classification Search
CPC ..... B60W 20/10; B60W 10/02; B60W 10/06; B60W 30/18054; B60W 2510/0652; B60W 2510/101; B60W 2510/102; B60W 20/40; B60W 20/50; B60W 10/08; B60K 6/547; B60K 6/48; F02D 17/00; Y02T 10/6221
USPC ................ 701/22; 180/65.265, 65.6; 903/930
See application file for complete search history.

(56) References Cited

U.S. PATENT DOCUMENTS 5,638,271 A * 6/1997 White et al. .................... 701/64
5,884,201 A * 3/1999 Kawai .............................. 701/22

(Continued)

FOREIGN PATENT DOCUMENTS

| JP | A-11-343893 | 12/1999 |
| JP | A-2001-221330 | 8/2001 |
| JP | A-2007-255566 | 10/2007 |

*Primary Examiner* — Marthe Marc-Coleman
(74) *Attorney, Agent, or Firm* — Oliff PLC

(57) ABSTRACT

The control apparatus according to the invention is applied to a hybrid vehicle having a manual transmission. The control apparatus controls a motor-generator such that a torque is input to the manual transmission when a neutral switch outputs a detection signal while an internal-combustion engine and the vehicle are stopped. The control apparatus starts up the internal-combustion engine when a release manipulation is performed to a clutch while the time rate of change of input-side rotating speed of the manual transmission by a torque providing control does not satisfy a predetermined criterion.

6 Claims, 7 Drawing Sheets

(56) References Cited

U.S. PATENT DOCUMENTS

| | | |
|---|---|---|
| 2002/0032097 A1 | 3/2002 | Koelle et al. |
| 2003/0060948 A1* | 3/2003 | Yamaguchi et al. ............ 701/22 |
| 2007/0225113 A1 | 9/2007 | Ogata |
| 2008/0300744 A1* | 12/2008 | Katsuta et al. .................. 701/22 |

* cited by examiner

VEHICLE CONTROL APPARATUS

TECHNICAL FIELD

The present invention relates to a control apparatus to be applied to a vehicle which includes an internal-combustion engine and an electric motor as a running power source, and in which a manual transmission manipulated by a driver is installed.

BACKGROUND ART

There is well known a hybrid vehicle configured such that torques of an internal-combustion engine and an electric motor, as running power sources, are output through a manual transmission. An apparatus, which estimates based on input and output rotating speeds of the manual transmission which shift position is selected within plural stepwise shift positions provided by the manual transmission, is known as a vehicle control apparatus (Patent Literature 1). Additionally, Patent Literatures 2 and 3 are known as prior art documents relating to the present invention.

CITATION LIST

Patent Literature

Patent Literature 1: Japanese Patent Application Laid-Open (JP-A) No. 2001-221330
Patent Literature 2: JP-A No. 2007-255566
Patent Literature 3: JP-A No. 11-343893

SUMMARY OF INVENTION

Technical Problem

In the vehicle mentioned above, sometimes start-up control is executed to start up the internal-combustion engine in response to a start manipulation by a driver who selects a start shift position of the manual transmission in a state that both the internal-combustion engine and the vehicle are stopped to start the vehicle. However, in the control apparatus of Patent Literature 1, it is impossible to estimate the shift position based on the input and output rotating speeds of the manual transmission in the state that the vehicle is stopped. Accordingly, in such start-up control, it is necessary to recognize a start shift manipulation for switching from a neutral position of the manual transmission to a start shift position based on a detection signal output from a shift position switch that detects the shift position of the manual transmission. Because of this, when a detecting device for detecting the neutral position has broken down while outputting the detection signal, the control apparatus mistakenly recognizes that the manual transmission is being at the neutral position, even if the driver actually performs the start shift manipulation. Accordingly, when such a breakdown is happened, the start-up control is not executed in response to the start shift manipulation of the driver.

An object of the invention is to provide a vehicle control apparatus that is possible to execute the start-up control of the internal-combustion engine even if the neutral-position detecting device has broken down in a state that both the internal-combustion engine and the vehicle are stopped.

Solution to Problem

According to one aspect of the present invention, a vehicle control apparatus that is applied to a vehicle including: an internal-combustion engine and an electric motor provided as running power sources; a manual transmission to which a torque of each of the internal-combustion engine and the electric motor is inputted, and to which a driver is allowed to perform a start shift manipulation in order to switch from a neutral position to a predetermined start shift position; and a clutch to which the driver is allowed to perform a release manipulation in order to interrupt a torque transmission between the internal-combustion engine and the manual transmission, the vehicle control apparatus comprising: a start-up controlling device configured to start up the internal-combustion engine under at least one condition that, in a state that the internal-combustion engine is stopped and also the vehicle is stopped, the release manipulation is performed to the clutch and also the start shift manipulation is performed to the manual transmission; a neutral-position detecting device configured to output a detection signal when the manual transmission is at the neutral position; and a torque providing controlling device configured to execute a torque providing control to control the electric motor such that the torque is inputted to the manual transmission when the neutral-position detecting device outputs the detection signal in the state that the internal-combustion engine is stopped and also the vehicle is stopped, wherein the start-up controlling device is configured to start up the internal-combustion engine when the release manipulation is performed to the clutch in a case that a change of input-side rotating speed of the manual transmission caused by the torque providing control does not satisfy a predetermined criterion.

When the start shift position is selected, continued is a state that the change of input-side rotating speed associated with the torque providing control is smaller in comparison with the change in the case of the neutral position. Accordingly, by setting a criterion of change so that the change in a case that the start shift position is selected and the change in a case of the neutral position can be distinguished from each other, even when the neutral-position detecting device is outputting the detection signal, in a case that the change does not satisfy a predetermined criterion for the neutral position it is possible to presume that the start shift position is selected. Thereby, it is possible to start up the internal-combustion engine even if the neutral-position detecting device is outputting the detection signal.

In one embodiment of the control apparatus of the present invention, the vehicle control apparatus may further comprise a breakdown diagnosing device configured to diagnose a breakdown of the neutral-position detecting device based on the change of the input-side rotating speed of the manual transmission caused by the torque providing control, and the start-up controlling device may be configured to start up the internal-combustion engine in a case the release manipulation is performed to the clutch in a state that a condition of the neutral-position detecting device is diagnosed as a breakdown by the breakdown diagnosing device. According to this embodiment, by executing the torque providing control, it is possible to diagnose the breakdown of the neutral-position detecting device in a state that the internal-combustion engine is stopped and also the vehicle is stopped. Thereby, it is possible to execute the start-up control in response to the start shift manipulation by the driver even if the neutral-position detecting device has broken down.

In one aspect of the control apparatus of the present invention, the vehicle may include a brake device having a brake pedal to be manipulated by the driver, the brake device being configured to based on the manipulation to the brake pedal, switch a state between a braking state in which the vehicle is braked and a release state in which the braking state is released, and the torque providing controlling device may be configured to start the torque providing control, when the brake pedal is switched from a manipulation state to a non-manipulation state with this as a trigger. According to this embodiment, it is possible to prevent a driver from feeling uncomfortable, because manipulation to the brake pedal which is usually performed by the driver intending to start the vehicle serves as a trigger of execution of the torque providing control. Since the torque providing control is executed in limited timing, it is possible to suppress power consumption necessary to execute the torque providing control.

In one embodiment of the control apparatus of the present invention, the vehicle may be provided with a braking-state retention device configured to keep the brake device in the braking state in a case that the brake pedal is switched from the manipulation state to the non-manipulation state, and the torque providing controlling device may be configured to control the braking-state retention device such that the torque providing control is executed in a state that the brake device is kept in the braking state. In this case, the brake device is kept in the braking state during the torque providing control. Therefore, it is possible to prevent reliably the erroneous movement of the vehicle.

In one embodiment of the control apparatus of the present invention, the breakdown diagnosing device may be configured to diagnose the condition of the neutral-position detecting device as the breakdown when the change of input-side rotating speed of the manual transmission by the torque providing control does not satisfy the predetermined reference. In a case that the start shift position is selected, continued is a state that change of the input-side rotating speed associated with the torque providing control is smaller compared with the case of the neutral position. Accordingly, by setting a criterion of change so that the change in a case that the start shift position is selected and the change in a case of the neutral position can be distinguished from each other, it is possible to diagnose the breakdown of the neutral-position detecting device.

The magnitude of the torque provided by the torque providing control device can be set properly. For example, the torque provided by the torque providing controlling device may be set as a microtorque having a level of magnitude with which the vehicle is not driven but the manual transmission idles in the state of being at the neutral position. If such microtorque is provided to the manual transmission, it is possible to reliably diagnose the breakdown of the neutral-position detecting device while preventing the movement of the vehicle during the torque providing control.

DESCRIPTION OF EMBODIMENTS

Figure 1:
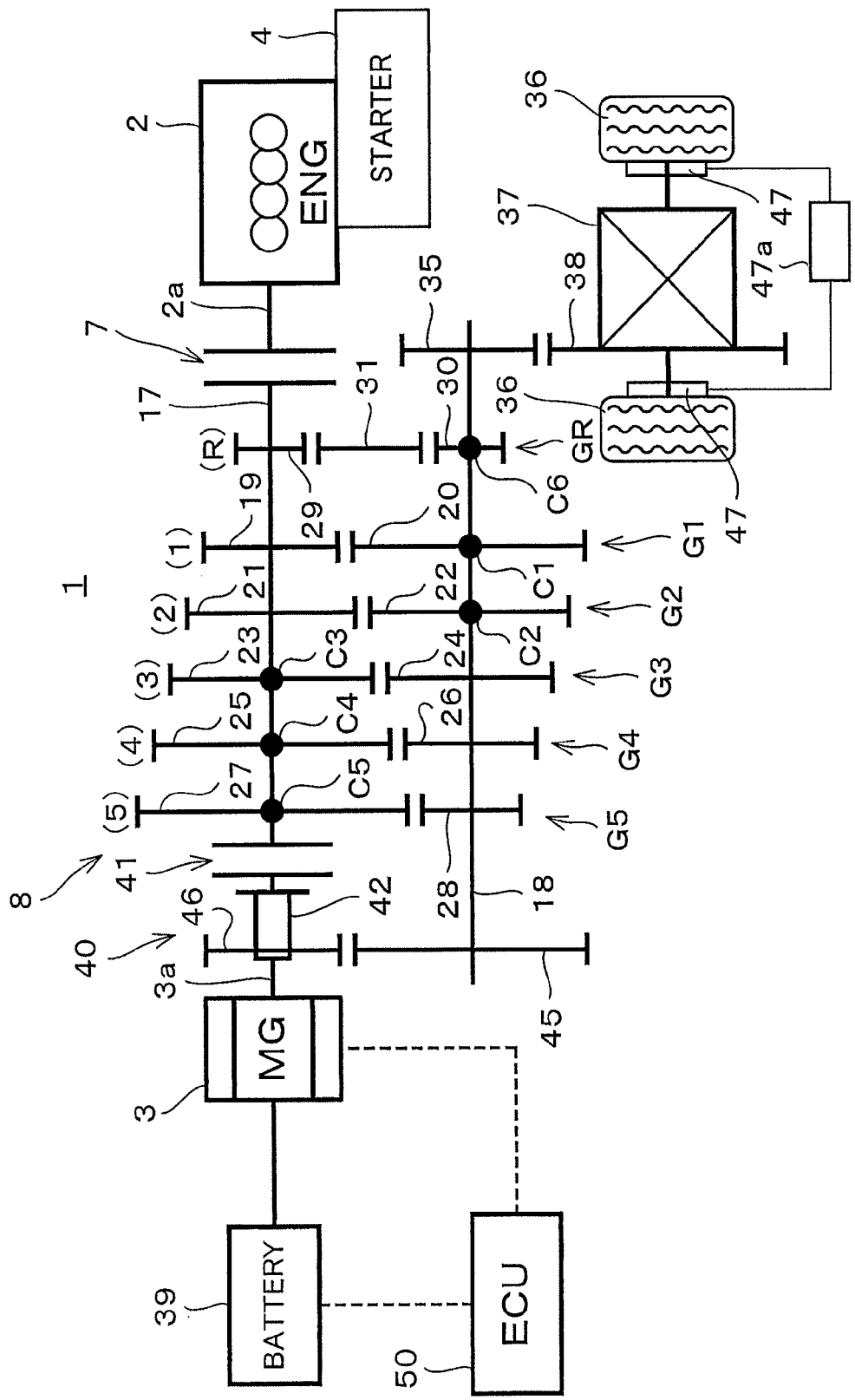
FIG. 1 is a view for explaining an outline of a vehicle in which a control apparatus according to an embodiment of the present invention is incorporated.

As illustrated in FIG. 1, a vehicle 1 is configured as what is called a hybrid vehicle, in which an internal-combustion engine 2 and a motor-generator 3 as an electric motor are provided as running power sources. A starter 4 that is used for start-up control is provided in the internal-combustion engine 2. Because the starter 4 has a structure similar to well-known structures, the description is omitted.

The internal-combustion engine 2 is configured as a spark-ignition type internal-combustion engine. An output shaft 2a of the internal-combustion engine 2 is connected to a manual transmission 8 via a clutch 7. The clutch 7 is disposed between the internal-combustion engine 2 and the manual transmission 8, and manipulated by a driver using a clutch pedal 10 (see FIG. 2) as a manipulation portion. When the driver presses down the clutch pedal 10 to perform a release manipulation, a torque transmission between the internal-combustion engine 2 and the manual transmission 8 is interrupted. A clutch-manipulation detecting device 11 is provided in the clutch pedal 10 in order to detect a manipulation state of the clutch pedal 10. The clutch-manipulation detecting device 11 includes a lower switch 11a and an upper switch 11b. When the clutch pedal 10 is completely pressed down, the lower switch 11a outputs a detection signal. While the clutch pedal 10 returns to a home position to permit the torque transmission, the upper switch 11b outputs a detection signal. Accordingly, the clutch-manipulation detecting device 11 can detect the manipulation state of the clutch pedal 10 based on the output state of the detection signal from each of the switches 11a and 11b.

The manual transmission 8 is configured so that one shift position can be selected from plural shift positions having five forward-drive shift positions and one reverse-drive shift position by allowing the driver to manipulate a shift manipulation device 15 provided as a manipulation portion. FIG. 3 illustrates a shift pattern of the shift manipulation device 15. In FIG. 3, (1) (2) (3) (4) and (5) correspond to the first, second, third, fourth and fifth speed positions respectively, (R) corresponds to a reverse-drive shift position, and (N) corresponds to a neutral position. (EV) in FIG. 3 corresponds to an electric running mode, in which the motor-generator 3 is used as the running power source in a state that the internal-combustion engine 2 is stopped. The driver can voluntarily switch a driving mode of the vehicle 1 to the electric running mode by selecting (EV) shown in FIG. 3. The shift manipulation device 15A is provided with a shift-position detecting device 16 (see FIG. 2) which detects a shift position. The shift-position detecting device 16 includes a first switch 16a, which outputs the detection signal when the shift manipulation device 15 is manipulated to the first speed shift position as the start shift position, a second switch 16b that outputs the detection signal when the shift manipulation device 15 is manipulated to the second speed shift position, a third switch 16c that outputs the detection signal when the shift manipulation device 15 is manipulated to the third speed shift position, a fourth switch 16d that outputs the detection signal when the shift manipulation device 15 is manipulated to the fourth speed shift position, and a fifth switch 16e that outputs the detection signal when the shift manipulation device 15 is manipulated to the fifth speed shift position. The shift-position detecting device 16 further includes a neutral switch 16x that outputs the detection signal when the shift manipulation device 15 is at a neutral position, an REV switch 16y that outputs the detection signal when the shift manipulation device 15 is manipulated to the reverse shift position, and an EV switch 16z that outputs the detection signal when the shift manipulation device 15 is manipulated to an EV position. The neutral switch 16x corresponds to a neutral-position detecting device of the present invention.

As illustrated in FIG. 1, the manual transmission 8 includes: an input shaft 17; an output shaft 18 extending in parallel with the input shaft 17; first to fifth gear pairs G1 to G5 that are provided between the input shaft 17 and the output shaft 18; and a reverse gear train GR. The first to fifth gear pairs G1 to G5 correspond to the first to the fifth speed shift positions respectively, and the reverse gear train GR corresponds to the reverse shift position. The first gear pair G1 includes a first drive gear 19 and a first driven gear 20 which engage with each other. The second gear pair G2 includes a second drive gear 21 and a second driven gear 22 which engage with each other. The third gear pair G3 includes a third drive gear 23 and a third driven gear 24 which engage with each other. The fourth gear pair G4 includes a fourth drive gear 25 and a fourth driven gear 26 which engage with each other. The fifth gear pair G5 includes a fifth drive gear 27 and a fifth driven gear 28 which engage with each other. A gear ratio of each of the gear pairs G1 to G5 is set so as to get smaller in the order of the first gear pair G1, the second gear pair G2, the third gear pair G3, the fourth gear pair G4, and the fifth gear pair G5. The reverse gear train GR includes a drive gear 29 that is provided on the input shaft 17 so as to rotate integrally with the input shaft 17, a driven gear 30 that is provided on the output shaft 18 so as to be rotatable relative to the output shaft 18, and an intermediate gear 31 that engages with each of the gears 29 and 30.

Each of the first drive gear 19 and the second drive gear 20 is provided on the input shaft 17 so as to rotate integrally with the input shaft 17. On the other hand, each of the third drive gear 23, the fourth drive gear 25, and the fifth drive gear 27 is provided on the input shaft 17 so as to be rotatable relative to the input shaft 17. Each of the first driven gear 20 and the second driven gear 22 is provided on the output shaft 18 so as to be rotatable relative to the output shaft 18. On the other hand, each of the third driven gear 24, the fourth driven gear 26, and the fifth driven gear 28 is provided on the output shaft 18 so as to rotate integrally with the output shaft 18.

In the manual transmission 8, coupling devices C1 to C6 are provided in order to enable one of the plural shift positions. Each of the coupling devices C1 to C6 is configured as a well-known dog clutch, and manipulated by the shift manipulation device 15 through a manipulation mechanism (not illustrated). The first coupling device C1 is operable between an engagement state, in which the first driven gear 20 is coupled to the output shaft 18 to integrally rotate the first driven gear 20 and the output shaft 18, and a release state in which the coupling of the first driven gear 20 and the output shaft 18 is released. Similarly, the second coupling device C2 is operable between an engagement state, in which the second driven gear 22 is coupled to the output shaft 18 to integrally rotate the second driven gear 22 and the output shaft 18, and a release state in which the coupling of the second driven gear 22 and the output shaft 18 is released. The third coupling device C3 is operable between an engagement state, in which the third drive gear 23 is coupled to the input shaft 17 to integrally rotate the third drive gear 23 and the input shaft 17, and a release state in which the coupling of the third drive gear 23 and the input shaft 17 is released. Similarly, the fourth coupling device C4 is operable between an engagement state, in which the fourth drive gear 25 is coupled to the input shaft 17 to integrally rotate the fourth drive gear 25 and the input shaft 17, and a release state in which the coupling of the fourth drive gear 25 and the input shaft 17 is released. The fifth coupling device C5 is operable between an engagement state, in which the fifth drive gear 27 is coupled to the input shaft 17 to integrally rotate the fifth drive gear 27 and the input shaft 17, and a release state in which the coupling of the fifth drive gear 27 and the input shaft 17 is released. The sixth coupling device C6 is operable between an engagement state, in which the driven gear 30 is coupled to the output shaft 18 to integrally rotate the driven gear 30 and the output shaft 18, and a release state in which the coupling of the driven gear 30 and the output shaft 18 is released. In the manual transmission 8, any one of the plural shift positions is enabled by putting one of the coupling devices C1 to C6 into the engagement state.

A first output gear 35 is provided on the output shaft 18 so as to rotate integrally with the output shaft 18. The first output gear 35 engages with a ring gear 38 that is provided in a case of a differential mechanism 37 joined to drive wheels 36. The torque outputted from the manual transmission 8 is transmitted to the drive wheels 36 through the ring gear 38 and the differential mechanism 37.

A battery 39 is electrically connected to the motor-generator 3 as a power supply of the motor-generator 3. Further, an MG input switching device 40 is connected to the motor-generator 3 in order to switch a transmission route of torque of the motor-generator 3. The MG input switching device 40 includes: a frictional type clutch 41 that is interposed between a motor shaft 3a and the input shaft 17; and a dog clutch 42 that is interposed between the motor shaft 3a and a gear train 43 transmitting power onto the side of the output shaft 18. The gear train 43 includes: a second output gear 45 that rotates integrally with the output shaft 18; and a motor drive gear 46 that is disposed coaxially with the motor shaft 3a while engaging with the second output gear 45. The frictional type clutch 41 is operable between an engagement state in which the motor shaft 3a and the input shaft 17 are connected to each other and a release state in which the connection of the motor shaft 3a and the input shaft 17 is released. The dog clutch 42 is operable between an engagement state in which the motor shaft 3a and the motor drive gear 46 are connected to each other and a release state in which the connection of the motor shaft 3a and the motor drive gear 46 is released. Further, the dog clutch 42 interlocks with the operation of the frictional type clutch 41 such that the dog clutch 42 becomes the release state when the frictional type clutch 41 is in the engagement state, and the dog clutch 42 becomes the engagement state when the frictional type clutch 41 is in the release state. Accordingly, the torque of the motor-generator 3 is selectively transmitted to one of the input shaft 17 and the output shaft 18 by the MG input switching device 40.

A brake device 47 is provided in the vehicle 1 in order to decelerate and stop the vehicle 1. The brake device 47 switches between a braking state in which the drive wheels 36 and other remaining wheels not illustrated are braked and a release state in which the braking released is released. The brake device 47 includes a brake pedal 48 (see FIG. 2) that is manipulated by a driver. The brake device 47 is manipulated between the braking state and the release state by the manipulation to the brake pedal 48. The brake device 47 includes a hydraulic circuit (not illustrated). A brake-hydraulic-pressure retention mechanism 47a is provided in the hydraulic circuit as a braking-state retention device. The braking-state retention device keeps the brake device 47 in the braking state when the brake pedal 48 is switched from a manipulation state to a non-manipulation state. The brake-hydraulic-pressure retention mechanism 47a includes an electromagnetic valve not illustrated, and holds a hydraulic pressure of the hydraulic circuit by energizing the electromagnetic valve. A brake-manipulation detecting device 49 is provided in the brake pedal 48 in order to detect the manipulation state of the brake pedal 48. The brake-manipulation detecting device 49 can detect the manipulation state in which the brake pedal 48 is pressed by a driver and the non-manipulation state in which the brake pedal 48 returns to an original position. Specifically, the brake-manipulation detecting device 49 outputs the detection signal in the manipulation state, and stops the output of the detection signal in the non-manipulation state.

Figure 2:
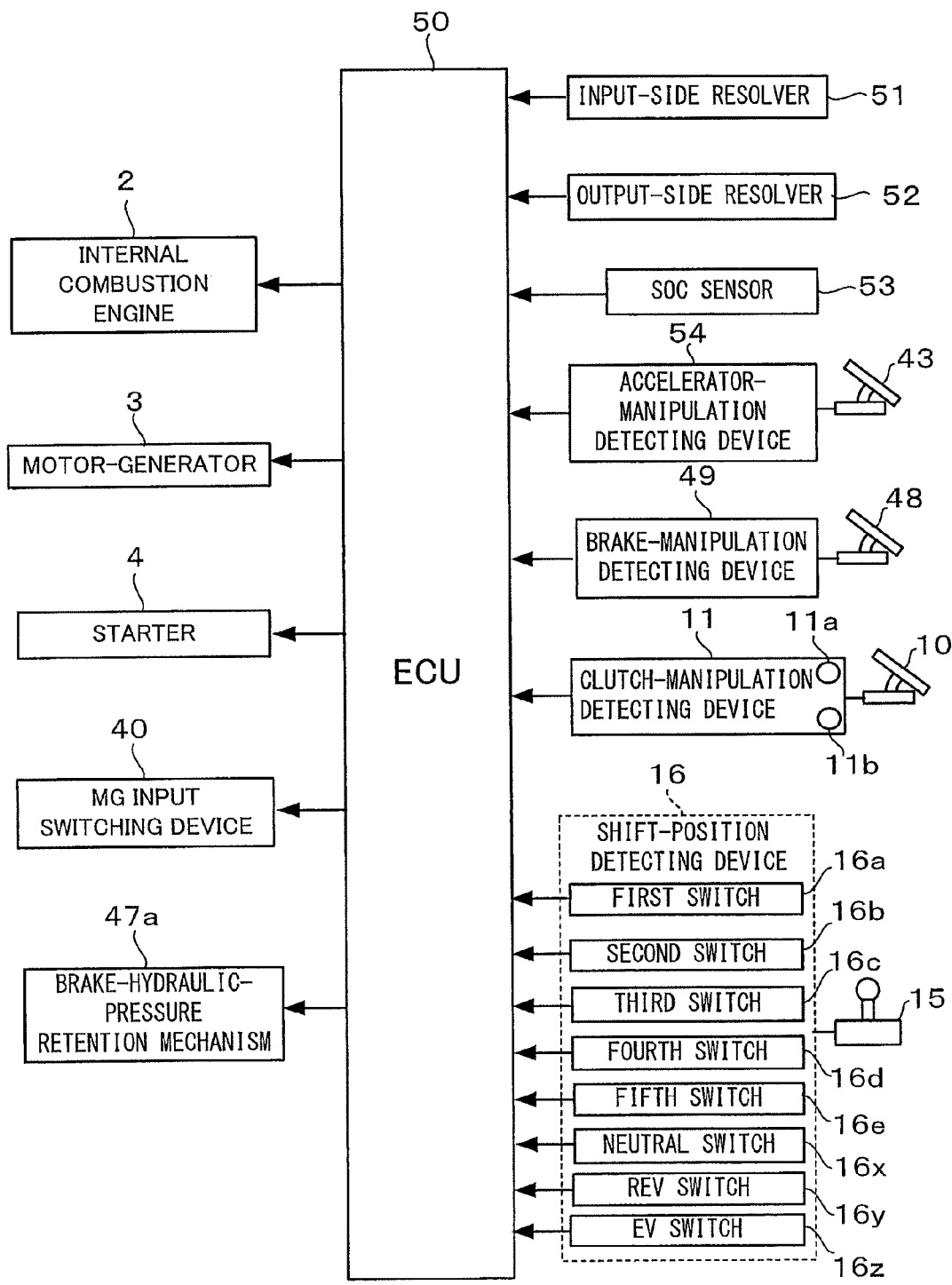
FIG. 2 is a block diagram illustrating a control system of the vehicle 1 in FIG. 1.
Figure 3:
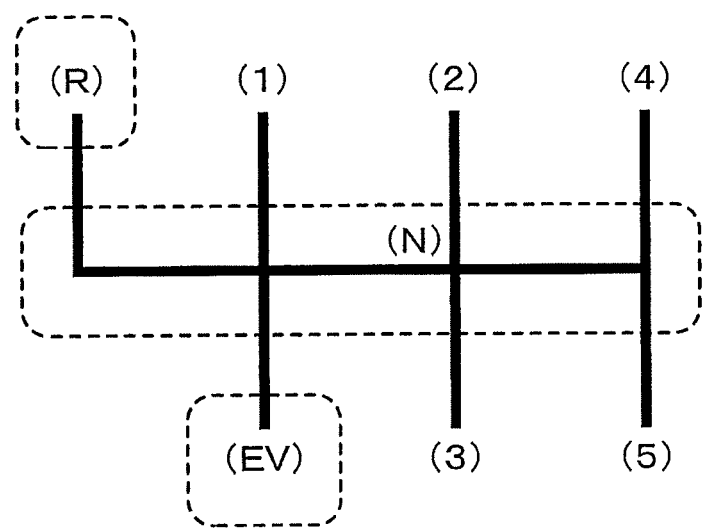
FIG. 3 is a view illustrating an example of a shift pattern of the vehicle 1.

As illustrated in FIG. 2, an Electronic Control Unit (ECU) 50 that is configured as a computer unit controls each of the internal-combustion engine 2, the motor-generator 3, auxiliary equipments such as the starter 4, and the MG input switching device 40. The ECU 50 holds various kinds of control programs in order to obtain a proper running state of the vehicle 1. The ECU 50 executes the programs to control the controlled objects including the internal-combustion engine 2 and the like above mentioned. As illustrated in FIG. 2, various kinds of sensors each outputting information on the running state of the vehicle 1 are connected to the ECU 50. In addition to the clutch-manipulation detecting device 11, the shift-position detecting device 16, and the brake-manipulation detecting device 49 which are mentioned above, as the sensors connected to the ECU 50, there are an input-side resolver 51 that outputs a signal according to a rotating speed of the input shaft 17, an output-side resolver 52 that outputs a signal according to a rotating speed of the output shaft 18, an SOC sensor 53 that outputs a signal according to a storage percentage of electricity of the battery 39, and an accelerator-manipulation detecting device 54 that outputs a signal according to a manipulation amount (the accelerator position) of an accelerator pedal 43.

The ECU 50 executes a running-mode switching control for switching between various kinds of running modes, such as a hybrid running mode in which the internal-combustion engine 2 and the motor-generator 3 are used as running power sources and the electric running mode in which only the motor-generator 3 is used as a running power source, in consideration of a level of an output request, the storage percentage of electricity of the battery 39 and the like. A stop control and a start-up control of the internal-combustion engine 2 are executed in association with the running-mode switching control. Additionally, also executed is a regenerative control to make the motor-generator 3 generate electric power by utilizing the power inputted from the drive wheels 36 at the moment of decelerating the vehicle 1. Described below is only control relating to the present invention within controls the ECU 50 executes, and descriptions of other controls are omitted.

Figure 4:
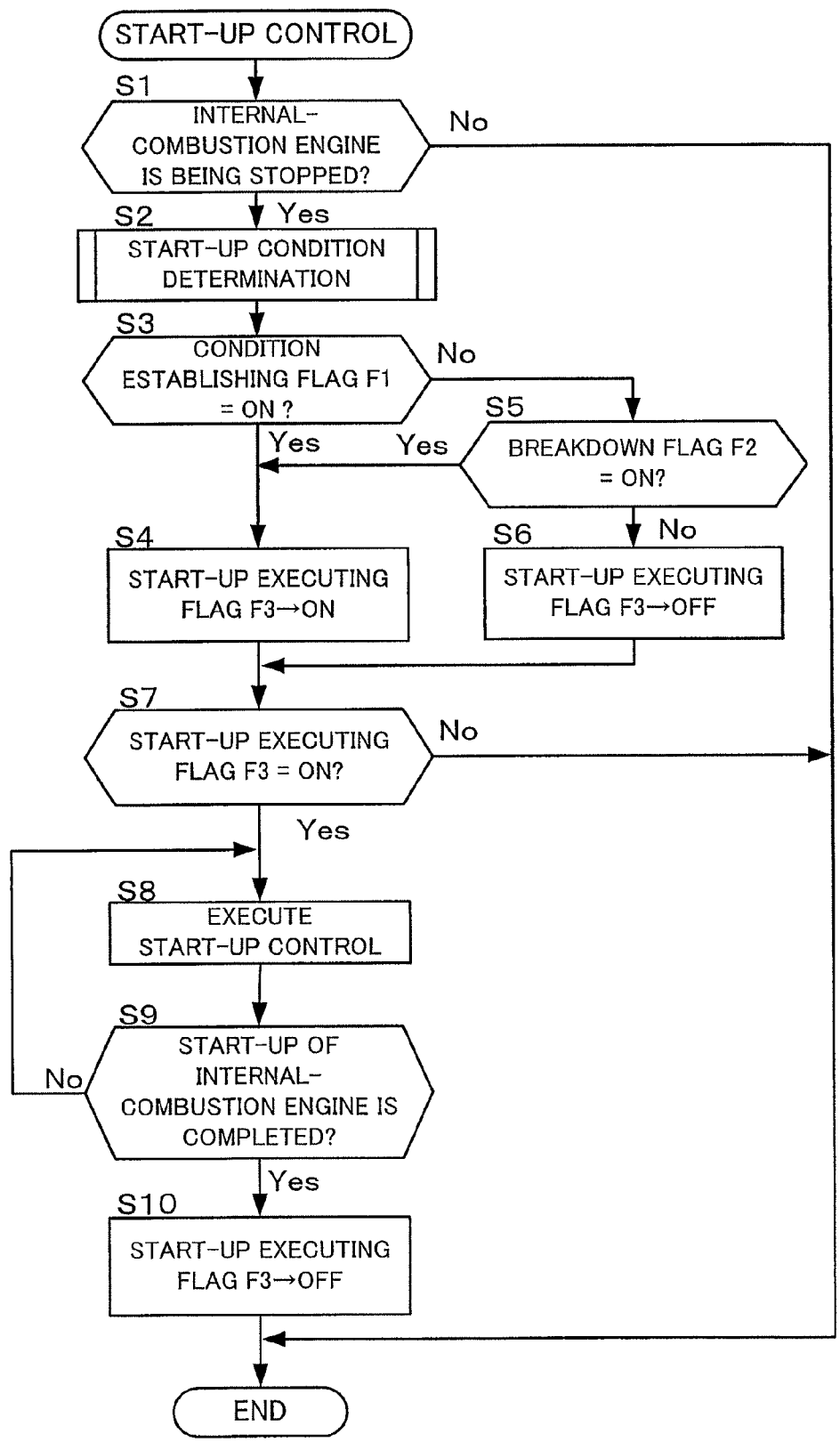
FIG. 4 is a flowchart illustrating an example of a control routine of start-up control.

The ECU 50 executes what is called an idle stop control, in which the internal-combustion engine 2 is stopped in response to stop of the vehicle 1 except a case that a prohibition condition, such as a lack of the storage percentage of electricity of the battery 39, is established, and the internal-combustion engine 2 is re-started in response to a start manipulation on which a start intention of the driver is reflected. The ECU 50 executes the start-up control shown in FIG. 4 in order to realize the re-start of the internal-combustion engine 2. A program for the routine in FIG. 4 is stored in the ECU 50, and is readout at felicitous moments to be repeatedly executed at predetermined intervals of a few milliseconds.

In Step S1, the ECU 50 determines whether the internal-combustion engine 2 is being stopped or not. The processing goes to Step S2 if the internal-combustion engine 2 is being stopped, and if not, subsequent steps are skipped to end the current routine. Whether the internal-combustion engine 2 is being stopped or not is determined by referring to a signal of a crank angle sensor, not illustrated, mounted on the internal-combustion engine 2.

Figure 5:
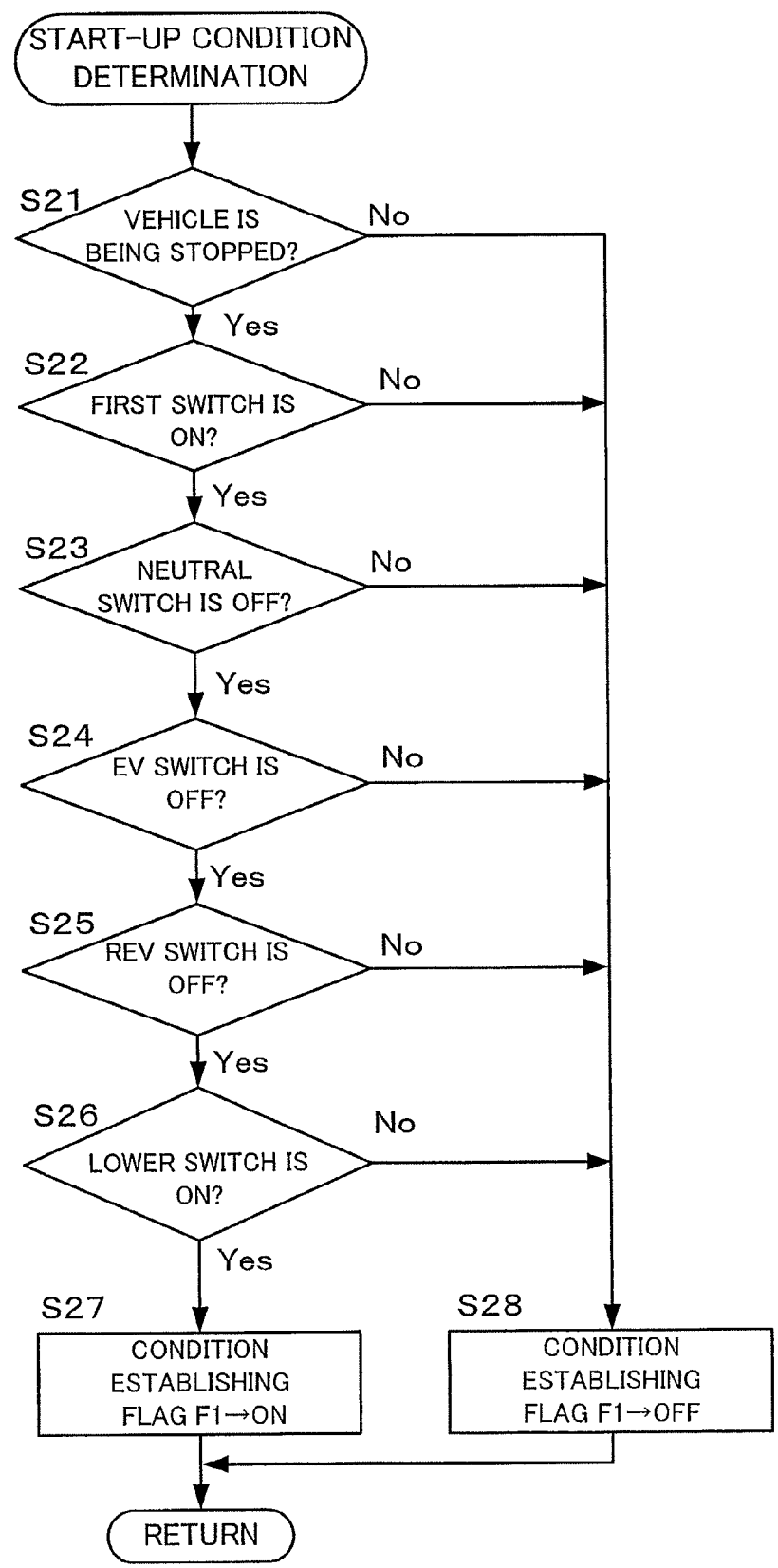
FIG. 5 is a flowchart illustrating an example of a routine of start-up condition determination processing defined in Step S2 in FIG. 4.

In Step S2, the ECU 50 executes determination processing shown in FIG. 5 where a start-up condition is determined. The determination processing in FIG. 5 has significance in determining whether or not the start intention of the driver exists. In Step S21, the ECU 50 determines whether the vehicle 1 is being stopped. In this step, the ECU 50 calculates a speed of the vehicle 1 based on the signal of the output-side resolver 52, and determines that the vehicle 1 is being stopped if it is found that the speed of the vehicle 1 is less than a determination value. The processing goes to Step S22 if the vehicle 1 is being stopped, and if not, the processing goes to Step S28. A value of speed at which the vehicle 1 can be assumed to be being stopped, for example, zero or more, can be applied to the determination value.

In Step S22, the ECU 50 determines whether the first switch 16a outputs the detection signal, namely, whether the first switch 16a is ON. When the first switch 16a is ON, it can be understood that the start shift manipulation for switching to the first speed position, that is, the start shift position has been performed. The processing goes to Step S23 if the first switch 16a is ON, and if not, the processing goes to Step S28.

In Step S23, the ECU 50 determines whether the neutral switch 16x does not output the detection signal, namely, whether the neutral switch 16x is OFF. By the determination in Step S23, it is confirmed that the start shift manipulation has not been performed by the driver. The processing goes to Step S24 when the neutral switch 16x is OFF, and if not, the processing goes to Step S28.

In Step S24, the ECU 50 determines whether the EV switch 16z does not output the detection signal, namely, whether the EV switch 16z is OFF. By the determination in Step S24, it is confirmed that the driver has no intention to select the electric running mode. The processing goes to Step S25 if the EV switch 16z is OFF, and if not, the processing goes to Step S28.

In Step S25, the ECU 50 determines whether the REV switch 16y does not output the detection signal, namely, whether the REV switch 16y is OFF. The internal-combustion engine 2 is not re-started at the moment of the reverse start because the vehicle 1 switches to the electric running mode in principle at the moment of the reverse. The processing goes to Step S26 if the REV switch 16y is OFF, and if not, the processing goes to Step S28.

In Step S26, the ECU 50 determines whether the lower switch 11a of the clutch-manipulation detecting device 11 outputs the detection signal, namely, whether the lower switch 11a is ON. When the lower switch 11a is ON, it can be understood that the driver has pressed the clutch pedal 10 to perform the release manipulation mentioned above. The condition that the upper switch 11b is OFF may be added to the Step S26. The processing goes to Step S27 if the lower switch 11a is ON, and if not, the processing goes to Step S28.

When the affirmative determinations are made in all the processes in Steps S22 to S26, it can be determined that the driver has the intention to start the vehicle 1 using the first speed shift position, that is, the start shift position. Therefore, in Step S27, the ECU 50 sets a condition establishing flag F1 to ON. The condition establishing flag F1 is a variable number indicating whether the start-up condition is established. The variable number is allocated to a predetermined storage area of the ECU 50. "1" is substituted into the variable number when the condition establishing flag F1 is ON, and "0" is substituted into the variable number when the condition establishing flag F1 is OFF. The description of the condition establishing flag F1 is also applicable to flags F2 and F3 to be used in other processing. On the other hand, if the negative determination is made at any one of the steps S22 to S26, it can be determined that the driver has no intention above mentioned. Therefore, in Step S28, the ECU 50 sets the condition establishing flag F1 to OFF.

Returning to FIG. 4, in Step S3, the ECU 50 determines whether the condition establishing flag F1 is ON. The processing goes to Step S4 if the condition establishing flag F1 is ON, and if not, the processing goes to Step S5.

In Step S4, the ECU 50 sets a start-up executing flag F3 to ON. The start-up executing flag F3 is a variable number for managing the execution of the start-up control of the internal-combustion engine 2. When the start-up executing flag F3 is ON, it can be understood that the internal-combustion engine 2 is in a state that the start-up control can be executed. In Step S5, the ECU 50 determines whether a breakdown flag F2, mentioned later, is ON. The processing goes to Step S4 if the breakdown flag F2 is ON, and if not, the processing goes to Step S6. In Step S6, the ECU 50 sets the start-up executing flag F3 to OFF.

In Step S7, the ECU 50 determines whether the start-up executing flag F3 is ON. The processing goes to Step S8 if the start-up executing flag F3 is ON. If the start-up executing flag F3 is not ON, subsequent steps are skipped to end the current routine.

In Step S8, the ECU 50 executes the start-up control. While driving the starter 4 to crank the internal-combustion engine 2, the ECU 50 starts up the internal-combustion engine 2 by executing fuel injection and spark ignition at predetermined timings.

In Step S9, the ECU 50 determines whether the start-up of the internal-combustion engine 2 is completed. It is determined that the start-up of the internal-combustion engine 2 is completed, using a criterion such that the rotating speed of the internal-combustion engine 2 exceeds a predetermined determination value. This determination value is set to the rotating speed at which the operation of the engine 2 can be continued without assist of the starter 4. The processing goes to Step S10 if the start-up of the internal-combustion engine 2 is completed, and if not, the processing returns to Step S8 to continue the start-up control.

In Step S10, the ECU 50 sets the start-up executing flag F3 to OFF.

In the determination processing in FIG. 5 which is defined in Step S2 in FIG. 4, in step S22, the start shift manipulation is detected by using the first switch 16a. And, in Step S23, it is recognized that the start shift manipulation has not been performed based on a state that the neutral switch 16x is OFF. Therefore, in a case that the neutral switch 16x has broken down while outputting the detection signal, even if the driver performs the start shift manipulation, it is mistakenly recognized because of the detection signal of the neutral switch 16x that the state of the manual transmission 8 is at the neutral position. Thereby, as apparently shown in FIG. 5, the condition establishing flag F1 is kept in the OFF state, even if with respect to the plural conditions to be determined in Step S23 to Step S26, all conditions except the condition to be determined in Step S23 are satisfied. For example, in a case that it is set as the condition to execute the start-up control that the condition establishing flag F1 is ON, the internal-combustion engine 2 cannot be started up in response to the start intention of the driver when the neutral switch 16x breaks down in the above state.

Therefore, the ECU 50 refers to the breakdown flag F2, which is set to ON when the neutral switch 16x has broken down, in Step S5 in FIG. 4. In a case that the breakdown flag F2 is set to ON, the ECU 50 sets the start-up executing flag F3 to ON to execute the start-up control. Thereby, it is possible to startup the internal-combustion engine 2 in response to the start intention of the driver even if the neutral switch 16x has broken down.

Figure 6:
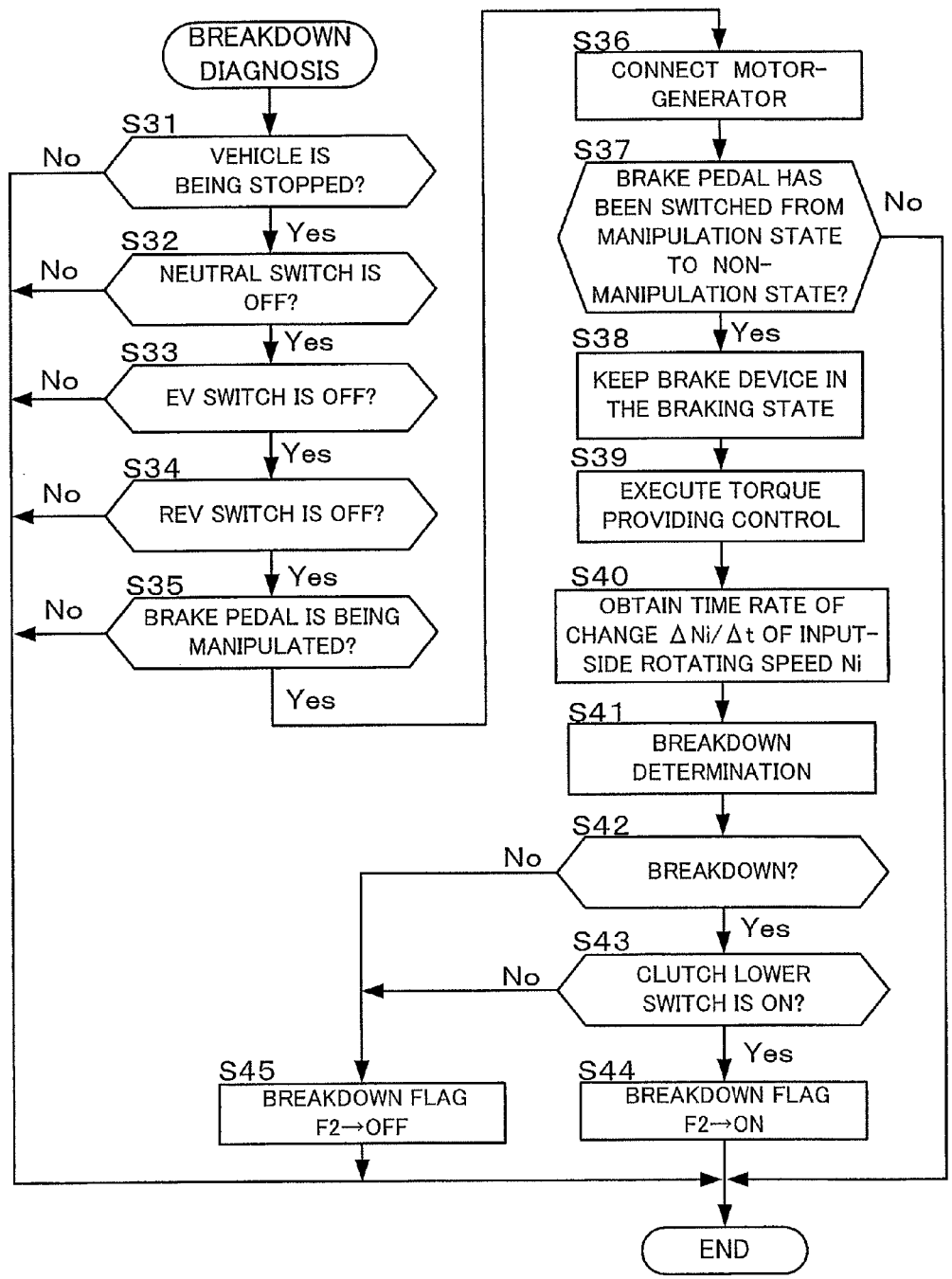
FIG. 6 is a flowchart illustrating an example of a routine of breakdown diagnosis processing.

The ECU 50 executes a breakdown diagnosis routine shown in FIG. 6 to diagnose the breakdown of the neutral switch 16x. A program of the routine in FIG. 6 is stored in the ECU 50, and is read out at felicitous moments and repeatedly executed at predetermined intervals of a few milliseconds in parallel with the program of the routine in FIG. 4.

In Step S31, the ECU 50 determines whether the vehicle 1 is being stopped. The processing goes to Step S32 if the vehicle 1 is being stopped. If not, subsequent processes are skipped to end the current routine.

In Step S32, the ECU 50 determines whether the neutral switch 16x is ON, namely, whether the neutral switch 16x is outputting the detection signal. The ECU 50 goes to Step S33 if the neutral switch 16x is ON. If not, subsequent processes are skipped to end the current routine.

In Step S33, the ECU 50 determines whether the EV switch 16z is OFF. The processing goes to Step S34 if the EV switch 16z is OFF. If not, subsequent processes are skipped to end the current routine.

In Step S34, the ECU 50 determines whether the REV switch 16y is OFF. The processing goes to Step S35 if the REV switch 16y is OFF. If not, subsequent processes are skipped to end the current routine.

In Step S35, the ECU 50 determines whether the brake pedal 48 is being manipulated. The determination in Step S35 is made in such a way that the ECU 50 refers to the signal of the brake-manipulation detecting device 49. The processing goes to Step S36 if the brake pedal 48 is being manipulated. If not, subsequent processes are skipped to end the current routine.

In Step S36, the ECU 50 connects the motor-generator 3 onto the side of the input shaft 17. The connection is executed by the ECU 50 which operates the MG-input switching device 40.

In Step S37, the ECU 50 determines whether the brake pedal 48 has been switched from the manipulation state to the non-manipulation state. The switching determination in Step S37 is made, as with the determination in Step S35, by the ECU 50 which refers to the signal of the brake-manipulation detecting device 49. The processing goes to Step S38 if the brake pedal 48 has been switched from the manipulation state to the non-manipulation state. If not, subsequent processes are skipped to end the current routine.

In Step S38, the ECU 50 keeps the brake device 47 in the braking state. The retention in Step S38 is executed by the ECU 50 which operates the brake-hydraulic-pressure retention mechanism 47a. Thereby, even in the non-manipulation state in which the driver takes his/her foot off the brake pedal 48, the wheels of the vehicle 1 is kept in a locked state.

In Step S39, the ECU 50 executes a torque providing control. In the torque providing control, the ECU 50 controls the motor-generator 3 such that a microtorque is inputted to the input shaft 17 of the manual transmission 8. The microtorque has a level of magnitude with which the vehicle 1 is not driven but the manual transmission 8 idles in the state of being at the neutral position.

In Step S40, based on the signal of the input-side resolver 51, the ECU 50 calculates time rate of change $\Delta Ni/\Delta t$ of the rotating speed of the input shaft 17 of the manual transmission 8, namely, of an input rotating speed Ni, and thereby, obtains the time rate of change.

In Step S41, the ECU 50 executes a breakdown determination. It is determined that the neutral switch 16x has broken down, in a case that the time rate of change ΔNi/Δt is equal to or lower than a determination threshold U1 during at least determination time T. As to a breakdown criterion that is equal to or lower than the determination threshold U1 during at least the determination time T, each of the determination time T and the determination threshold U1 is experimentally defined so that a case that the manual transmission 8 is at the neutral position and a case that first speed shift position is being selected are distinguished from each other in a state that the microtorque is inputted to the manual transmission 8.

In Step S42, the ECU 50 determines whether it has been determined that the neutral switch 16x has broken down in Step S41, namely, whether it has been determined that the time rate of change ΔNi/Δt satisfies the breakdown criterion. The processing goes to Step S43 if it is determined that the neutral switch 16x has broken down in Step S41, and if not the processing goes to Step S45.

In Step S43, the ECU 50 determines whether the lower switch 11a of the clutch-manipulation detecting device 11 is ON. The case that the lower switch 11a is ON indicates that the driver presses the clutch pedal 10 to perform the above mentioned release manipulation. The processing goes to Step S44 if the lower switch 11a is ON, and if not, the processing goes to Step S45.

In Step S44, the ECU 50 sets the breakdown flag F2 to ON, the breakdown flag F2 being used to manage the existence or non-existence of the breakdown of the neutral switch 16x. In Step S45, the ECU 50 sets the breakdown flag F2 to OFF.

According to the routine in FIG. 6, the torque providing control in Step S39 is executed, and the time rate of change of the input rotating speed of the manual transmission 8 associated with the torque providing control is used as the determination criterion in Step S41. Therefore, the condition of the neutral switch 16x can be diagnosed as the breakdown in a state that the internal-combustion engine 2 is stopped and also the vehicle 1 is stopped. In addition, as one of the conditions to set the breakdown flag F2 to ON in step S44, it is required that the lower switch 11a of the clutch-manipulation detecting device 11 is ON. Thereby, practically, the start-up executing flag F3 is set to ON in Step S4 in FIG. 4 only in a case that it is assumable that the driver has performed the start shift manipulation. Accordingly, it is possible to realize the start-up control in response to the start intention of the driver.

As one of the conditions to execute the torque providing control, it is required in step S37 that the brake pedal 48 has been switched from the manipulation state to the non-manipulation state. Therefore, since the manipulation to the brake pedal 48 usually performed by the driver who intends to start the vehicle 1 serves as a trigger to the execution of the torque providing control, it is possible to prevent providing the driver uncomfortable feeling. Additionally, since the torque providing control is executed in such limited timing, it is possible to suppress a power consumption required for executing the torque providing control.

As described above, the microtorque inputted to the manual transmission 8 in the torque providing control has the level of magnitude with which the vehicle 1 is not driven but the manual transmission 8 idles in the state of the neutral position. Because of this, the breakdown of the neutral switch 16x can be reliably diagnosed while the vehicle 1 is prevented from moving during the torque providing control. Additionally, the brake-hydraulic-pressure retention mechanism 47a keeps the brake device 47 in the braking state during the torque providing control. Because of this, it is possible to reliably prevent the erroneous movement of the vehicle 1.

In the above embodiment, the ECU 50 functions as the start-up controlling device of the present invention by executing the control routine in FIG. 4. The ECU 50 functions as the breakdown diagnosing device of the present invention by executing the routine in FIG. 6. The ECU 50 functions as the torque providing controlling device of the present invention by executing the Steps S35 to S39 in FIG. 6.

Although the invention is not limited to the above embodiment, various changes and modifications can be made within a range of the scope of the present invention. The condition to execute the start-up control is not limited to the condition shown in FIG. 5, and an additional condition may be added. In the routine in FIG. 4, when the neutral switch 16x breaks down, the start-up control is executed by setting the start-up executing flag F3 to ON. Alternatively, instead of the routine in FIG. 4, the start-up control may be also executed by rewriting to ON, the condition establishing flag F1 which has been set to OFF due to the breakdown of the neutral switch 16x.

It is not always necessary for the ECU 50 to diagnose the breakdown of the neutral switch 16. Because, it may be assumed that the start shift position is selected in a case that the change of the input-side rotating speed associated with the torque providing control does not satisfy a criterion for the neutral position. For example, the start-up control can be executed by the routine in FIG. 7 without executing the breakdown diagnosis processing in FIG. 6. The routine in FIG. 7 corresponds to a routine in which Step S5 of the routine in FIG. 4 is replaced with Steps S51 to S57. The common portions between the routine in FIG. 7 and the routine in FIG. 4 are designated by the same reference numbers, and the description thereof is omitted.

The Steps S51 to S55 are identical to steps S36 to S40 in FIG. 6. It is determined in Step S56 whether the time rate of change ΔNi/Δt does not satisfy the criterion for the neutral position. A determination criterion which is used here is identical to the determination criterion in Step S41 in FIG. 6, that is, the time rate of change ΔNi/Δt is equal to or lower than the determination threshold U1 during at least the determination time T.

In Step S57, the ECU 50 determines whether the lower switch 11a of the clutch-manipulation detecting device 11 is ON. The Step S57 is identical to the Step S43 in FIG. 6. When the lower switch 11a is ON, it can be understood that the driver presses the clutch pedal 10 to perform the release manipulation above mentioned. The processing goes to Step S4 if the lower switch 11a is ON, and the processing goes to Step S6 if not.

Figure 7:
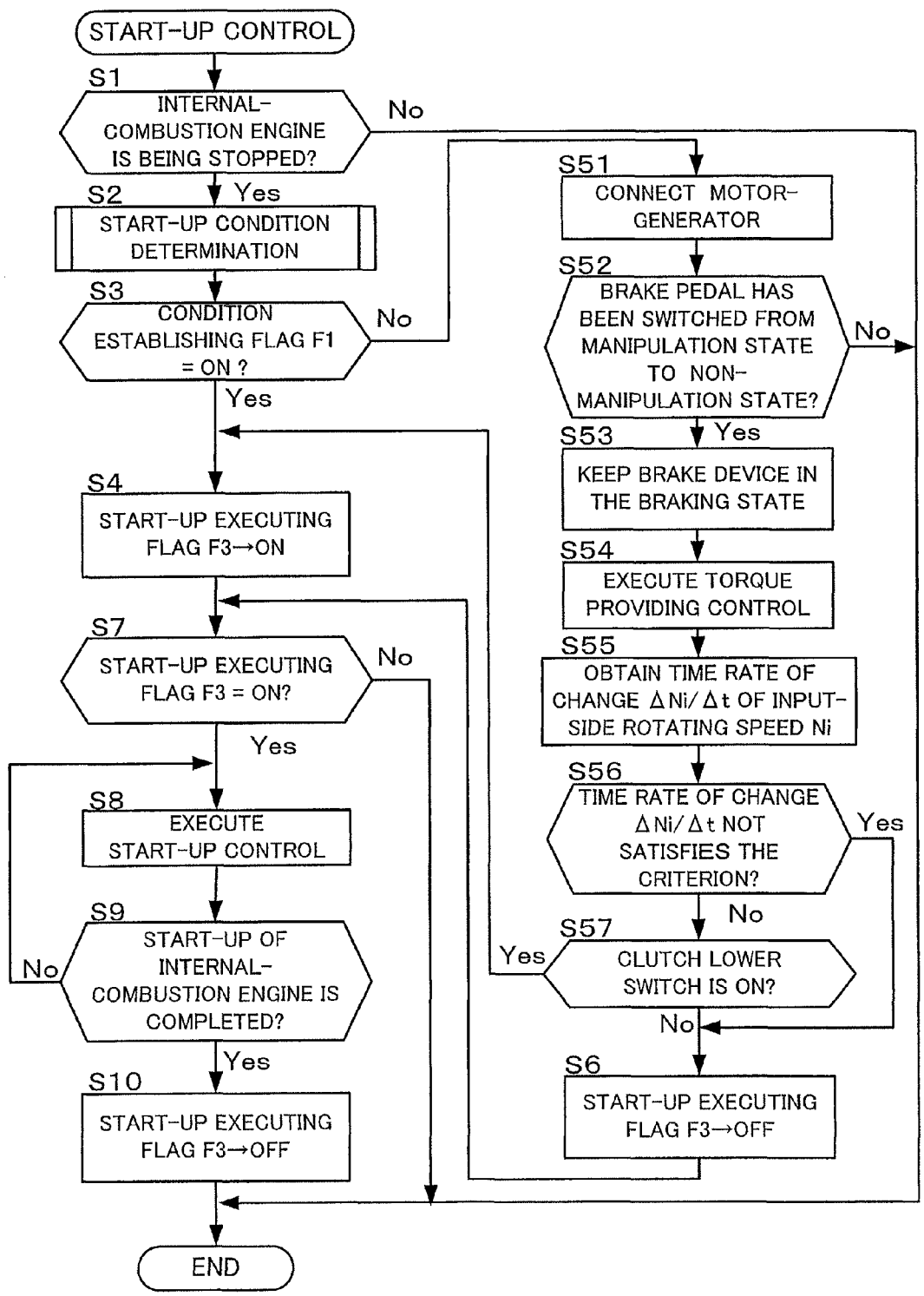
FIG. 7 is a flowchart illustrating an example of a control routine of start-up control according to another embodiment of the present invention.

According to the start-up control in FIG. 7, even if the breakdown of the neutral switch 16x is not diagnosed, in a case that the time rate of change ΔNi/Δt by the torque providing control does not satisfy the criterion for the neutral position, it is assumed that the first speed position that is the start shift position is selected, and it is possible to make the internal-combustion engine start up.

In the torque providing control, the torque inputted to the manual transmission is not limited to the microtorque of the above embodiment. For example, the torque inputted to the manual transmission can be larger than the microtorque under the condition that the movement of vehicle being stopped is interrupted by the brake device and the like. It is not always necessary to keep the torque constant during the torque providing control, and the torque may be changed during the torque providing control.

In the above embodiment, the neutral switch 16x is an example of the neutral-position detecting device. The neutral-position detecting device of the present invention may be a device which is not recognized as a physical switch, as long as outputting the detection signal when the manual transmission is at the neutral position.

The invention claimed is:

1. A vehicle control apparatus applied to a vehicle including: an internal-combustion engine and an electric motor provided as running power sources; a manual transmission to which a torque of each of the internal-combustion engine and the electric motor is inputted, and to which a driver is allowed to perform a start shift manipulation in order to switch from a neutral position to a predetermined start shift position; and a clutch to which the driver is allowed to perform a release manipulation in order to interrupt a torque transmission between the internal-combustion engine and the manual transmission, the vehicle control apparatus including at least one Electronic Control Unit (ECU) and comprising:
a start-up controlling device, which the ECU is programmed to function as, configured to start up the internal-combustion engine under at least one condition that, in a state that the internal-combustion engine is stopped and also the vehicle is stopped, the release manipulation is performed to the clutch and also the start shift manipulation is performed to the manual transmission;
a neutral-position detecting device configured to output a detection signal when the manual transmission is at the neutral position; and
a torque providing controlling device, which the ECU is programmed to function as, configured to execute a torque providing control to control the electric motor such that the torque is inputted to the manual transmission when the neutral-position detecting device outputs the detection signal in the state that the internal-combustion engine is stopped and also the vehicle is stopped,
wherein the start-up controlling device is configured to start up the internal-combustion engine when the release manipulation is performed to the clutch in a case that a change of input-side rotating speed of the manual transmission caused by the torque providing control does not satisfy a predetermined criterion.

2. The vehicle control apparatus according to claim 1, further comprising
a breakdown diagnosing device, which the ECU is programmed to function as, configured to diagnose a breakdown of the neutral-position detecting device based on the change of the input-side rotating speed of the manual transmission caused by the torque providing control,
wherein the start-up controlling device is configured to start up the internal-combustion engine in a case the release manipulation is performed to the clutch in a state that a condition of the neutral-position detecting device is diagnosed as a breakdown by the breakdown diagnosing device.

3. The vehicle control apparatus according to claim 2, wherein
the breakdown diagnosing device is configured to diagnose the condition of the neutral-position detecting device as the breakdown when the change of input-side rotating speed of the manual transmission by the torque providing control does not satisfy the predetermined reference.

4. The vehicle control apparatus according to claim 1, wherein
the vehicle includes a brake device having a brake pedal to be manipulated by the driver, the brake device being configured to based on the manipulation to the brake pedal, switch a state between a braking state in which the vehicle is braked and a release state in which the braking state is released, and
the torque providing controlling device is configured to start the torque providing control, when the brake pedal is switched from a manipulation state to a non-manipulation state with this as a trigger.

5. The vehicle control apparatus according to claim 4, wherein
the vehicle is provided with a braking-state retention device, which the ECU is programmed to function as, configured to keep the brake device in the braking state in a case that the brake pedal is switched from the manipulation state to the non-manipulation state, and
the torque providing controlling device is configured to control the braking-state retention device such that the torque providing control is executed in a state that the brake device is kept in the braking state.

6. The vehicle control apparatus according to claim 1, wherein
the torque provided by the torque providing controlling device is set as a microtorque having a level of magnitude with which the vehicle is not driven but the manual transmission idles in the state of the neutral position.

* * * * *